(12) United States Patent
Ashkenazi et al.

(10) Patent No.: US 8,364,179 B2
(45) Date of Patent: Jan. 29, 2013

(54) FEEDBACK-BASED MANAGEMENT OF VARIABLE-RATE COMMUNICATION LINKS

(75) Inventors: Ehud Ashkenazi, Kfar Saba (IL); Jonathan Friedmann, Tel Aviv (IL)

(73) Assignee: Provigent Ltd., Herzliya (IL)

( * ) Notice: Subject to any disclaimer, the term of this patent is extended or adjusted under 35 U.S.C. 154(b) by 246 days.

(21) Appl. No.: 12/750,730

(22) Filed: Mar. 31, 2010

(65) Prior Publication Data

US 2010/0185917 A1 Jul. 22, 2010

Related U.S. Application Data

(62) Division of application No. 11/787,059, filed on Apr. 13, 2007.

(51) Int. Cl.
*H04Q 7/20* (2006.01)

(52) U.S. Cl. ............ 455/464; 455/69; 455/63; 455/126; 455/23; 455/67.15; 455/204; 455/17

(58) Field of Classification Search ............... 455/452.2, 455/67.11, 23, 67.15, 464, 17; 370/206, 370/208, 330, 252, 232
See application file for complete search history.

(56) References Cited

U.S. PATENT DOCUMENTS

| | | |
|---|---|---|
| 4,288,658 A | 9/1981 | Bieber et al. |
| 4,291,196 A | 9/1981 | Spaniol et al. |
| 4,292,465 A | 9/1981 | Wilson et al. |
| 4,310,813 A | 1/1982 | Yuuki et al. |
| 4,321,705 A | 3/1982 | Namiki |
| 4,367,555 A | 1/1983 | Namiki et al. |
| 4,397,022 A | 8/1983 | Weng et al. |
| 4,438,530 A | 3/1984 | Steinberger |
| 4,479,258 A | 10/1984 | Namiki |
| 4,557,330 A | 12/1985 | Russell et al. |
| 4,575,862 A | 3/1986 | Tahara et al. |
| 4,606,054 A | 8/1986 | Amitay et al. |
| 4,627,045 A | 12/1986 | Olson et al. |
| 4,631,734 A | 12/1986 | Foschini |
| 4,644,562 A | 2/1987 | Kavehrad et al. |

(Continued)

FOREIGN PATENT DOCUMENTS

| | | |
|---|---|---|
| EP | 454249 A | 10/1991 |
| EP | 1 289 179 A1 | 3/2003 |

(Continued)

OTHER PUBLICATIONS

Japanese Patent Application # 2007-313885 Official Action dated Feb. 10, 2011.

(Continued)

*Primary Examiner* — Matthew Anderson
*Assistant Examiner* — Ganiyu A Hanidu
(74) *Attorney, Agent, or Firm* — Sterne, Kessler, Goldstein & Fox P.L.L.C.

(57) ABSTRACT

A method for communication includes transmitting data from a transmitter to a receiver using Adaptive Coding and Modulation (ACM). The data rate is set by selecting, based on feedback, an ACM profile defining a Forward Error Correction code and a modulation scheme. Upon detecting that the feedback is unusable, an operation of the transmitter is changed independently of the feedback.

In another method, data is exchanged over two opposite directions of a bidirectional link that uses ACM by communicating using two ACM profiles. A joint constraint is defined on the two directions. The two ACM profiles are set based on first and second measured reception quality metrics of the two link directions, to meet the joint constraint. In yet another method, a subset of the ACM profiles is temporarily disabled, and the data is transmitted using only the ACM profiles that are not disabled.

26 Claims, 2 Drawing Sheets

U.S. PATENT DOCUMENTS

| | | | |
|---|---|---|---|
| 4,688,235 A | 8/1987 | Tahara et al. | |
| 4,761,784 A | 8/1988 | Srinivasagopalan et al. | |
| 4,857,858 A | 8/1989 | Tahara | |
| 4,910,468 A | 3/1990 | Ohtsuka et al. | |
| 4,914,676 A | 4/1990 | Iwamatsu et al. | |
| 4,992,798 A | 2/1991 | Nozue et al. | |
| 4,995,040 A | 2/1991 | Best et al. | |
| 5,023,620 A | 6/1991 | Matsuura | |
| 5,068,667 A | 11/1991 | Mizoguchi | |
| 5,075,697 A | 12/1991 | Koizumi et al. | |
| 5,237,318 A | 8/1993 | Auclair et al. | |
| 5,241,320 A | 8/1993 | Mizoguchi | |
| 5,247,541 A | 9/1993 | Nakai | |
| 5,268,685 A | 12/1993 | Fujiwara | |
| 5,311,545 A | 5/1994 | Critchlow | |
| 5,311,546 A | 5/1994 | Paik et al. | |
| 5,313,467 A | 5/1994 | Varghese et al. | |
| 5,383,224 A | 1/1995 | Mizoguchi | |
| 5,406,589 A | 4/1995 | Iwamatsu et al. | |
| 5,432,522 A | 7/1995 | Kurokami | |
| 5,471,508 A | 11/1995 | Koslov | |
| 5,495,502 A | 2/1996 | Andersen | |
| 5,506,956 A | 4/1996 | Cohen | |
| 5,524,027 A | 6/1996 | Huisken | |
| 5,541,951 A | 7/1996 | Juhasz et al. | |
| 5,541,955 A | 7/1996 | Jacobsmeyer | |
| 5,614,914 A | 3/1997 | Bolgiano et al. | |
| 5,631,896 A | 5/1997 | Kawase et al. | |
| 5,663,990 A | 9/1997 | Bolgiano et al. | |
| 5,684,810 A | 11/1997 | Nakamura et al. | |
| 5,694,438 A | 12/1997 | Wang et al. | |
| 5,710,799 A | 1/1998 | Kobayashi | |
| 5,727,032 A | 3/1998 | Jamal et al. | |
| 5,742,640 A | 4/1998 | Haoui et al. | |
| 5,742,646 A | 4/1998 | Woolley et al. | |
| 5,809,070 A | 9/1998 | Krishnan et al. | |
| 5,838,224 A | 11/1998 | Andrews | |
| 5,838,740 A | 11/1998 | Kallman et al. | |
| 5,844,950 A | 12/1998 | Aono et al. | |
| 5,862,186 A | 1/1999 | Kumar | |
| 5,901,343 A | 5/1999 | Lange | |
| 5,905,574 A | 5/1999 | Vollbrecht et al. | |
| 5,920,595 A | 7/1999 | Iwamatsu | |
| 5,940,453 A | 8/1999 | Golden | |
| 5,987,060 A | 11/1999 | Grenon et al. | |
| 6,215,827 B1 | 4/2001 | Balachandran et al. | |
| 6,236,263 B1 | 5/2001 | Iwamatsu | |
| 6,252,912 B1 | 6/2001 | Salinger | |
| 6,262,994 B1 | 7/2001 | Dirschedl et al. | |
| 6,307,505 B1 | 10/2001 | Green | |
| 6,366,568 B1 | 4/2002 | Bolgiano et al. | |
| 6,418,164 B1 | 7/2002 | Endres et al. | |
| 6,452,964 B1 | 9/2002 | Yoshida | |
| 6,466,562 B1 | 10/2002 | Yoshida et al. | |
| 6,476,643 B2 | 11/2002 | Hugues et al. | |
| 6,490,243 B1 | 12/2002 | Tanaka et al. | |
| 6,501,953 B1 | 12/2002 | Braun et al. | |
| 6,611,942 B1 | 8/2003 | Battistello et al. | |
| 6,628,707 B2 | 9/2003 | Ratie et al. | |
| 6,647,059 B1 | 11/2003 | Faruque | |
| 6,665,810 B1 | 12/2003 | Sakai | |
| 6,678,259 B1 | 1/2004 | Schwengler | |
| 6,735,168 B1 | 5/2004 | Schnell et al. | |
| 6,763,374 B1 | 7/2004 | Levi et al. | |
| 6,826,238 B2 | 11/2004 | Ahn | |
| 6,829,298 B1 | 12/2004 | Abe et al. | |
| 6,836,515 B1 | 12/2004 | Kay et al. | |
| 6,836,791 B1 | 12/2004 | Levi et al. | |
| 6,842,444 B2 | 1/2005 | Bolgiano et al. | |
| 6,888,794 B1 | 5/2005 | Jovanovic et al. | |
| 6,915,463 B2 | 7/2005 | Vieregge et al. | |
| 6,920,189 B1 | 7/2005 | Spalink | |
| 6,954,504 B2 | 10/2005 | Tiedemann et al. | |
| 6,993,024 B1 | 1/2006 | McDermott, III et al. | |
| 7,003,042 B2 | 2/2006 | Morelos-Zaragoza et al. | |
| 7,016,296 B2 | 3/2006 | Hartman | |
| 7,046,753 B2 | 5/2006 | Resheff et al. | |
| 7,047,029 B1 | 5/2006 | Godwin et al. | |
| 7,127,669 B2 | 10/2006 | Platenberg et al. | |
| 7,133,425 B2 | 11/2006 | McClellan | |
| 7,133,441 B1 | 11/2006 | Barlev et al. | |
| 7,187,719 B2 | 3/2007 | Zhang | |
| 7,200,188 B2 | 4/2007 | Fague et al. | |
| 7,254,190 B2 | 8/2007 | Kwentus et al. | |
| 7,260,361 B2 | 8/2007 | Jacobsen | |
| 7,296,063 B2 | 11/2007 | Levi et al. | |
| 7,333,556 B2 | 2/2008 | Maltsev et al. | |
| 7,366,091 B1 | 4/2008 | Lahti et al. | |
| 7,415,548 B2 | 8/2008 | Mahany et al. | |
| 7,418,240 B2 | 8/2008 | Hsu et al. | |
| 7,460,583 B2 | 12/2008 | Khayrallah et al. | |
| 7,463,867 B2 | 12/2008 | Luo et al. | |
| 7,492,701 B2 * | 2/2009 | Song et al. | 370/208 |
| 7,630,509 B2 | 12/2009 | Zarrabizadeh | |
| 7,646,881 B2 | 1/2010 | Zarrabizadeh | |
| 7,653,055 B2 | 1/2010 | Guo et al. | |
| 7,751,372 B2 | 7/2010 | Monsen | |
| 7,770,097 B2 | 8/2010 | Platenberg et al. | |
| 7,839,952 B2 | 11/2010 | Sofer et al. | |
| 7,898,972 B2 | 3/2011 | Huang et al. | |
| 8,000,387 B2 | 8/2011 | Ungerboeck et al. | |
| 2001/0017897 A1 | 8/2001 | Ahn | |
| 2002/0016933 A1 | 2/2002 | Smith et al. | |
| 2002/0051498 A1 | 5/2002 | Thomas et al. | |
| 2002/0061752 A1 | 5/2002 | Kurokami | |
| 2002/0161851 A1 | 10/2002 | Chang | |
| 2002/0181490 A1 | 12/2002 | Frannhagen et al. | |
| 2003/0021370 A1 | 1/2003 | Menkhoff | |
| 2003/0043778 A1 * | 3/2003 | Luschi et al. | 370/349 |
| 2003/0045307 A1 * | 3/2003 | Arviv et al. | 455/464 |
| 2003/0056158 A1 | 3/2003 | Yue | |
| 2003/0066082 A1 | 4/2003 | Kliger et al. | |
| 2003/0133469 A1 | 7/2003 | Brockmann et al. | |
| 2003/0135532 A1 | 7/2003 | Peting | |
| 2003/0185319 A1 | 10/2003 | Kolze | |
| 2003/0203721 A1 | 10/2003 | Berezdivin et al. | |
| 2004/0017860 A1 | 1/2004 | Liu | |
| 2004/0063416 A1 | 4/2004 | Kuenen et al. | |
| 2004/0076240 A1 | 4/2004 | Wang et al. | |
| 2004/0081081 A1 | 4/2004 | Colombo | |
| 2004/0086668 A1 | 5/2004 | Dronzek | |
| 2004/0151108 A1 | 8/2004 | Blascoet et al. | |
| 2004/0198296 A1 | 10/2004 | Hui et al. | |
| 2004/0217179 A1 | 11/2004 | Garner | |
| 2005/0002474 A1 | 1/2005 | Limberg | |
| 2005/0010853 A1 | 1/2005 | Duvant et al. | |
| 2005/0063496 A1 | 3/2005 | Guillouard et al. | |
| 2005/0075078 A1 * | 4/2005 | Makinen et al. | 455/67.15 |
| 2005/0123073 A1 | 6/2005 | Ginesi et al. | |
| 2005/0149844 A1 | 7/2005 | Tran et al. | |
| 2005/0169401 A1 | 8/2005 | Abraham et al. | |
| 2005/0190868 A1 | 9/2005 | Khandekar et al. | |
| 2005/0239398 A1 | 10/2005 | Lai | |
| 2005/0265436 A1 * | 12/2005 | Suh et al. | 375/221 |
| 2005/0286618 A1 | 12/2005 | Abe | |
| 2006/0008018 A1 | 1/2006 | Kolze | |
| 2006/0013181 A1 | 1/2006 | Stolpman et al. | |
| 2006/0056554 A1 | 3/2006 | Lin et al. | |
| 2006/0093058 A1 | 5/2006 | Skraparlis | |
| 2006/0107179 A1 | 5/2006 | Shen et al. | |
| 2006/0193400 A1 | 8/2006 | Morris et al. | |
| 2006/0203943 A1 | 9/2006 | Scheim et al. | |
| 2006/0209939 A1 | 9/2006 | Mantha | |
| 2006/0268976 A1 * | 11/2006 | Baum et al. | 375/239 |
| 2007/0076719 A1 | 4/2007 | Allan et al. | |
| 2007/0116143 A1 | 5/2007 | Bjerke et al. | |
| 2007/0116162 A1 | 5/2007 | Eliaz et al. | |
| 2007/0133397 A1 | 6/2007 | Bianchi et al. | |
| 2007/0153726 A1 | 7/2007 | Bar-Sade et al. | |
| 2007/0177565 A1 | 8/2007 | Lee | |
| 2007/0230641 A1 | 10/2007 | Yehudai | |
| 2008/0002581 A1 * | 1/2008 | Gorsetman et al. | 370/232 |
| 2008/0008257 A1 | 1/2008 | Yonesi et al. | |
| 2008/0037675 A1 | 2/2008 | Lin et al. | |
| 2008/0043829 A1 | 2/2008 | Shiue et al. | |
| 2008/0080634 A1 * | 4/2008 | Kotecha et al. | 375/267 |
| 2008/0117891 A1 | 5/2008 | Damnjanovic et al. | |

| | | | |
|---|---|---|---|
| 2008/0130616 | A1 | 6/2008 | Wengerter et al. |
| 2008/0130726 | A1* | 6/2008 | Sofer et al. .................. 375/220 |
| 2008/0137779 | A1 | 6/2008 | Valadon |
| 2008/0155373 | A1 | 6/2008 | Friedman et al. |
| 2008/0254749 | A1 | 10/2008 | Ashkenazi et al. |
| 2008/0259901 | A1 | 10/2008 | Friedman et al. |
| 2009/0022239 | A1 | 1/2009 | Kimura et al. |
| 2009/0049361 | A1 | 2/2009 | Koren et al. |
| 2009/0092208 | A1 | 4/2009 | Montekyo et al. |
| 2010/0185917 | A1 | 7/2010 | Ashkenazi et al. |
| 2010/0185918 | A1 | 7/2010 | Ashkenazi et al. |

FOREIGN PATENT DOCUMENTS

| | | | |
|---|---|---|---|
| EP | 1365519 | A1 | 11/2003 |
| EP | 1 435 146 | A1 | 7/2004 |
| JP | 6021762 | A | 1/1994 |
| JP | 9064791 | A | 3/1997 |
| JP | 2000115244 | A | 4/2000 |
| JP | 200161187 | A | 3/2001 |
| JP | 2001217761 | A | 8/2001 |
| JP | 20029861 | A | 1/2002 |
| JP | 2002345023 | A | 11/2002 |
| JP | 2003068228 | A | 3/2003 |
| JP | 2004079893 | A | 6/2004 |
| JP | 2004179821 | A | 6/2004 |
| JP | 2005269530 | A | 9/2005 |
| JP | 2005333473 | A | 12/2005 |
| JP | 2007250050 | A | 9/2007 |
| JP | 2008033069 | A | 2/2008 |
| WO | 0060802 | A1 | 10/2000 |
| WO | 0076114 | A1 | 12/2000 |
| WO | 0077952 | A1 | 12/2000 |
| WO | 0154339 | A1 | 7/2001 |
| WO | 2004086668 | A1 | 10/2004 |
| WO | 2005122414 | A1 | 12/2005 |
| WO | 2006097735 | A2 | 9/2006 |
| WO | 2006118892 | A1 | 11/2006 |
| WO | 2007040906 | A2 | 4/2007 |

OTHER PUBLICATIONS

U.S. Appl. No. 11/973,464 Official Action dated Feb. 7, 2011.
Japanese Patent Application # 2007-172513 Official Action dated Jan. 4, 2011.
Chinese Patent Application # 200580028811.1 Official Action dated Apr. 25, 2011.
European Patent Application # 06809892.0 Search Report dated Apr. 24, 2011.
Chinese Patent Application # 200780025545.6 Official Action dated Mar. 24, 2011.
U.S. Appl. No. 11/891,754 Official Action dated Apr. 5, 2011.
U.S. Appl. No. 11/787,059 Official Action dated Jun. 28, 2011.
American National Standard T1.105-2001, "Synchronous optical network (SONET)—basic description including multiplex structure, rates and format", Alliance for Telecommunications Industry Solutions, 2001.
Benani et al., "Comparison of Carrier Recovery Techniques in M-QAM Digital Communications Systems", Proceedings of 13th Annual Canadian Conference on Electrical and Computer Engineering, pp. 73-77, Halifax, Canada, Mar. 7-10, 2000.
Best R., "Phase Locked Loops: Design, Simulation, and Applications", McGraw Hill Professional, 5th Edition, pp. 81-92, Jun. 20, 2003.
Goeckel D., "Adaptive Coding for Time-Varying Channels Using Outdated Fading Estimates", IEEE Transactions on Communications, vol. 47, No. 6, Jun. 1999.
Dr. Lin-Nan Lee, "LDPC Codes, Application to Next Generation Communication Systems", Hughes Network System Oct. 8, 2003.
Duel-Hallen et al., "Long Range Prediction of Fading Signals: Enabling Adaptive Transmission for Mobile Radio Channels" IEEE Signal Processing Magazine, vol. 17, No. 3, pp. 62-75, May 2000.
ITU Recommendation G.703 , "General Aspects of Digital Transmission Systems—Terminal Equipments—Physical/Electrical Characteristics of Hierarchical Digital Interfaces", Geneva, Switzerland 1991.
ITU Recommendation G.704, "Series G: Transmission Systems and Media, Digital Systems and Networks, Digital Transmission Systems—Terminal Equipments—General, Synchronous Frame Structures used at 1544, 6312, 2048, 8448 and 44736 kbit/s hierarchical levels", Oct. 1998.
Gagnon et al., "A Simple and Fast Carrier Recovery Algorithm for High-Order QAM", IEEE Communications Letters, vol. 9, No. 10, pp. 918-920, Oct. 2005.
GR-253-CORE by Telcordia Technologies, "Synchronous optical network (SONET) transport systems: common criteria" Issue 3, Sep. 2000.
Ericsson AB, "Capacity without ties; Mini-Link microwave transmission solution", EN/LZT 712 0117 R2, Molndal, Sweden, 2005.
Hu et al., "Adaptive Modulation Using Long Range Prediction for Flat Rayleigh Fading Channels", Proceedings of the IEEE International Symposium on Information Theory, Sorrento, Italy, Jun. 25-30, 2000.
ITU Recommendation G.707/Y.1322, "Series G: Transmission systems and media, digital systems and networks, digital terminal equipments—general: Series Y: global information infrastructure and internet protocol aspects—transport; Network node interface for the syncronours digital hierarchy (SDH)", Oct. 2000.
ITU Recommendation G.783, "General Aspects of Digital Transmission Systems: Terminal Equipments—Characteristics of Syncronous Digital Hierarchy (SDH) Equipment Functional Blocks", Jan. 1994.
Johnson et al., "Blind Equalization Using the Constant Modulus Criterion: A Review", Proceedings of the IEEE, vol. 86, No. 10, Oct. 1998.
Kim et al., "Design of Carrier Recovery Algorithm for High-Order QAM with Large Frequency Acquisition Range", IEEE Internatinal Conference on Communications (ICC), pp. 1016-1020, vol. 4, Helsinki, Finland, Jun. 11-14, 2001.
Kschischang F., "Capacity Approching Codes, Iterative Decoding Algorithms and Their Application: Codes defined on Graphs", IEEE Communications Magazine, pp. 118-125, Aug. 2003.
Richardson et al., "Capacity Approaching codes; Iterative Decoding Algorithms and Their Application: The Renaissance of Gallager's Low-Densityy parity Check Codes", IEEE Communications Magazine, pp. 126-131, Aug. 2003.
Riegel M., "Requirements for edge-to edge estimation of time deivision multiplexed (TDM) circuits over packet switching networks", IETF Network Working Group, RFC 4197, Oct. 2005.
Satorius et al., "Adaptive modulation and coding techniques in MUOS fading/scintillation environments", Proceedings of the IEEE Military Communications Conference, Anaheim, USA, vol. 1, pp. 321-327, Oct. 7-10, 2002.
Standard T1.102-1993 of the ANSI, "American National Standard for Telecommunications—Digital Hierarchy—Electrical Interfaces", Dec. 1993.
Calderbank A., "Multilevel Codes and Multistage Decoding", IEEE Transactions on Communications, vol. 37, No. 3 Mar. 1989.
Colavolpe et al., "Algorithms for iterative decoding in the presence of strong phase noise", IEEE Journal on Selected Areas in Communications, vol. 23, No. 9, pp. 1748-1757, Sep. 2005.
Gallager R., "Low-Density Parity-Check Codes", IRE Transactions on Information Theory, vol. 7, pp. 21-28, Jan. 1962.
Hassan K., "LPDC encoded pilots for iterative receiver improvement", Thesis submiteed to the College Engineering of Wichita State University, Dec. 2005.
Niu et al., "Iterative Channel Estimation and LDPC Decoding over Flat Fading Channels: A Factor Graph Approach" 2003 Conference on Information Sciences and Systems, the Johns Hopkins University, Mar. 12-14, 2003.
Imai et al., "A New Multilevel Coding Method Using Error-Correcting Codes", IEEE Transactions on Information Theory, vol. IT-23, No. 3, 1977.
Sun J., "An Introduction to low Density Parity Check (LDPC) Codes", West Virginia University, Jun. 3, 2003.
Mielczarek et al., "Improving phase estimation with enhanced turbo decoders", Nordic Radio Symposium 2001 (NRS01), Nynashamn, Sweden, Apr. 3-5, 2001.

Mielczarek et al., "Phase offset estimation using enhanced turbo decoders", Proceedings of the IEEE International Conference on Communications (ICC2002), vol. 3, pp. 1536-16460, New York, USA, Apr. 28-May 2, 2002.

Pottie et al., "Multilevel Codes based on Partitioning", IEEE Transactions on Information Theory, vol. 35, No. 1, pp. 87-98, Jan. 1989.

Richardson et al. , "An Introduction to the Analysis of Iterative Coding Systems", Proceedings of the 1999 Institute for Mathematics and its Applications (IMA) Summer Program: codes, systems and graphical models, Minneapolis, USA Aug. 2-6, 1999.

Ryan et al., "An introduction to LDPC Codes", GlobeCom 2003, San Francisco, USA, Dec. 5, 2003.

Saroka et al., "Joint Carrier Phase Estimation and Turbo Decoding Using Bit-Carrier-Phase APP Decoder", IEEE Transactions on Communications, 2004.

Worthen et al., "Unified Design of Iterative Receivers Using Factor Graphs", IEEE Transactions on Information Theory, vol. 47, No. 2, pp. 843-849, Feb. 2001.

Jin et al., "Analysis of Joint Channel Estimation and LDPC Decoding on Block Fading Channels", International Symposium on Information Theory and its Applications, ISITA2004, Parma, Italy, Oct. 10-13, 2004.

Diaz et al., "The use of Coding and Diversity Combining of Mitigating Fading Effects in a DS/CDMA System", IEEE Transactions on Vehicular Technology, vol. 47, No. 1, pp. 95-102, Feb. 1, 1998.

Lampe et al., "Misunderstandings about Link Adaptation for Frequency Selective Fading Channels", 13th IEEE International Symposium on Personal, Indoor and Mobile Radio Communications, vol. 2, pp. 710-714, Sep. 15-18, 2002.

Nishimura et al., "Dynamic Rate Control for Mobile Multimedia Communication", Proceedings of the 1998 Communications Society Conference of IEICE, Sep. 29 - Oct. 2, 1998 (abstract).

U.S. Appl. No. 11/285,414 Official Acrtion dated Mar. 6, 2009.
U.S. Appl. No. 11/285,414 Official Action dated May 23, 2008.
U.S. Appl. No. 11/285,414 Official Action dated Nov. 12, 2008.
U.S. Appl. No. 11/394,172 Official Action dated Jan. 21, 2009.
U.S. Appl. No. 11/394,172 Official Action dated Jun. 16, 2008.
U.S. Appl. No. 11/394,172 Official Action dated Jun. 26, 2009.
U.S. Appl. No. 11/479,050 Official Action dated Jul. 24, 2009.
U.S. Appl. No. 11/479,050 Official Action dated Mar. 4, 2009.
U.S. Appl. No. 11/483,078 Official Action dated Mar. 27, 2009.
U.S. Appl. No. 11/483,078 Official Action dated Jun. 2, 2008.
U.S. Appl. No. 11/483,078 Official Action dated Nov. 12, 2008.
International Application PCT/IL2006/001344 Search Report dated Mar. 13, 2008.
International Application PCT/IL2007/000326 Search Report dated Aug. 1, 2008.
International Application PCT/IL2007/000812 Search Report dated Jun. 4, 2008.
International Application PCT/IL2007/001410 Search Report dated Jan. 26, 2009.
International Application PCT/IL2008/001321 Search Report dated Feb. 19, 2009.
International Application PCT/IL2008/000453 Search Report dated Jun. 17, 2009.
Chinese Application No. 200580028811.1 Official Action dated Dec. 5, 2008.
European Application No. 08290290.9 Official Action dated Jun. 18, 2009.
European Application No. 08290290.9 Search Report dated Oct. 15, 2008.
Japanese Application No. 2007518808 Official Action dated Jan. 29, 2009.
Japanese Application No. 2007518808 Official Action dated Jun. 4, 2008.
Japanese Patent Application # 2007/172513 Official Action dated Jul. 5, 2010 (with translation).
European Patent Application # 08738160.4 Search Report dated Aug. 26, 2010.
U.S. Appl. No. 11/787,059 Official Action dated Jul. 9, 2010.
U.S. Appl. No. 11/634,781 Official Action dated Mar. 3, 2010.
U.S. Appl. No. 11/787,059 Official Action dated Mar. 3, 2010.
U.S. Appl. No. 11/394,172 Official Action dated Mar. 2, 2010.
U.S. Appl. No. 11/634,781 Official Action dated Sep. 21, 2009.
U.S. Appl. No. 11/645,828 Official Action dated Sep. 15, 2009.
U.S. Appl. No. 11/973,464 Official Action dated Sep. 30, 2010.
Nishimura et al., "Dynamic Rate Control for Mobile Multimedia Communication", Proceedings of the 1998 Communications Society Conference of Ieice, Sep. 29-Oct. 2, 1998 (abstract).
Notice of Allowance mailed Jan. 3, 2012 for U.S. Appl. No. 11/787,059, filed Apr. 13, 2007; 8 pages.
Non-Final Rejection mailed Jan. 24, 2012 for U.S. Appl. No. 12/750,731, filed Mar. 31, 2010; 9 pages.

* cited by examiner

FEEDBACK-BASED MANAGEMENT OF VARIABLE-RATE COMMUNICATION LINKS

CROSS-REFERENCE TO RELATED APPLICATIONS

This application is a divisional of U.S. patent application Ser. No. 11/787,059, filed Apr. 13, 2007, whose disclosure is incorporated herein by reference.

FIELD OF THE INVENTION

The present invention relates generally to communication systems, and particularly to methods and systems for managing variable-rate communication links.

BACKGROUND OF THE INVENTION

Various communication systems, such as microwave links, transfer data at variable data rates. For example, U.S. Patent Application Publication 2005/0075078, whose disclosure is incorporated herein by reference, describes a method for transmitting signals via a point-to-point microwave radio link. In order to improve the efficiency on the radio link, transmitted packets are classified before transmission based on quality of service parameters assigned to each packet. The signals are modulated for transmission using a real-time adaptive modulation. The modulation is adapted based on the current traffic amount, signal quality measurements indicative of the propagation conditions on the radio link, and the classification of packets comprised in the signals.

U.S. Patent Application Publication 2006/0209939, whose disclosure is incorporated herein by reference, describes a method, system and apparatus for determining a block format to be used to transmit a block of data over a channel to a receiver. The method includes collecting a series of reception-quality measurements, determining the rate of change of the reception-quality or the rate at which retransmission requests are being made, and, depending upon the magnitude of the rate of change or the rate of retransmission requests, either: averaging the lowest portion of the reception-quality measurements during the time-series and determining the block format based upon the average; or determining the block format based upon the most recent reception-quality measurements.

As another example, PCT Publication WO 2004/086668, whose disclosure is incorporated herein by reference, describes a method for transmitting and receiving data in a wireless link having a variable link quality by selecting a suitable constellation using at least an indication of the link quality and encoding the data using the selected suitable constellation.

SUMMARY OF THE INVENTION

Embodiments of the present invention provide a method for communication, including:

transmitting data from a transmitter to a receiver over a wireless communication link at a variable data rate using Adaptive Coding and Modulation (ACM);

setting the data rate at which the data is transmitted by selecting, based on feedback information that is fed back from the receiver to the transmitter, an ACM profile that defines a Forward Error Correction (FEC) code and a modulation scheme for encoding and modulating the data; and upon detecting that the feedback information is unusable, changing an operation of the transmitter independently of the feedback.

In some embodiments, the feedback information includes a reception quality metric evaluated by the receiver. The reception quality metric may include at least one metric selected from a group of metrics consisting of a Received Signal Level (RSL), a Signal to Noise Ratio (SNR), a Signal to Interference and Noise Ratio (SINR), a Mean Square Error (MSE), a Bit Error Rate (BER), a Frame Error Rate (FER) and a metric produced by a decoding process of the FEC.

In another embodiment, changing the operation of the transmitter includes switching to an ACM profile whose FEC code and modulation scheme define an improved link budget with respect to an ACM profile that is currently selected. In yet another embodiment, setting the data rate includes selecting the ACM profile from a predefined set of possible ACM profiles, and the ACM profile having the improved link budget includes an ACM profile having a highest link budget among the possible ACM profiles. In an alternative embodiment, the ACM profile having the improved link budget includes an ACM profile having a next-better link budget among the possible ACM profiles. In still another embodiment, switching to the ACM profile having the improved link budget includes gradually switching to ACM profiles having progressively improving link budgets.

In a disclosed embodiment, setting the data rate includes sending the feedback information from the receiver to the transmitter over a feedback communication link that uses ACM, and changing the operation of the transmitter includes transmitting a request to the receiver to send the feedback information to the transmitter using an ACM profile having an improved link budget with respect to an ACM profile that is currently selected in the feedback communication link.

The wireless communication link may include one of a microwave link and a millimeter wave link. In another embodiment, the data is transmitted from the transmitter to the receiver in first time intervals, and the feedback information is fed back from the receiver to the transmitter in second time intervals that do not overlap the first time intervals. In still another embodiment, the data is transmitted from the transmitter to the receiver in a first radio frequency, and the feedback information is fed back from the receiver to the transmitter in a second radio frequency that is different from the first radio frequency.

In some embodiments, the communication link is one of a plurality of communication links in a point-to-multipoint system, and detecting that the feedback information is unusable and changing the operation of the transmitter are performed independently in each of the communication links in the plurality. Alternatively, changing the operation of the transmitter may be performed jointly in the communication links in the plurality upon detecting that the feedback information from one or more of the communication links is unusable.

There is also provided, in accordance with an embodiment of the present invention, a method for communication, including:

exchanging data between first and second communication systems over first and second opposite directions of a bidirectional wireless communication link that uses Adaptive Coding and Modulation (ACM) by communicating at respective first and second variable data rates that are determined by respective first and second ACM profiles, each ACM profile defining a Forward Error Correction (FEC) code and a modulation scheme for encoding and modulating the data;

defining a joint constraint on an operation of the first and second directions;

measuring respective first and second reception quality metrics of the first and second directions of the communication link; and setting the first and second ACM profiles based on the first and second measured reception quality metrics, so as to cause the operation of the first and second directions to meet the joint constraint.

In an embodiment, communicating at the first and second variable data rates includes selecting the first and second ACM profiles from a predefined set of possible ACM profiles that define respective FEC codes and modulation schemes. The reception quality metrics may include at least one metric type selected from a group of metric types consisting of a Received Signal Level (RSL), a Signal to Noise Ratio (SNR), a Signal to Interference and Noise Ratio (SINR), a Mean Square Error (MSE), a Bit Error Rate (BER), a Frame Error Rate (FER) and a metric produced by a decoding process of the FEC.

In a disclosed embodiment, the joint constraint specifies that the first ACM profile is equal to the second ACM profile. Alternatively, the joint constraint may specify that both the first and the second directions of the communication link meet a predefined Quality-of-Service (QoS) level.

In another embodiment, setting the first and second ACM profiles includes selecting the first and second ACM profiles by the first communication system, and instructing the second communication system by the first communication system to set the selected ACM profiles. Alternatively, setting the first and second ACM profiles includes selecting the first ACM profile by the first communication system, detecting the selected first ACM profile by the second communication system, and selecting the second ACM profile by the second communication system responsively to the first ACM profile, so as to meet the joint constraint.

In yet another embodiment, the communication link is one of a plurality of bidirectional communication links in a point-to-multipoint system, the joint constraint is defined on the operation of the first and second directions of the communication links in the plurality, and setting the ACM profiles includes setting the ACM profiles of the first and second directions of the communication links in the plurality so as to meet the joint constraint.

The wireless communication link may include one of a microwave link and a millimeter wave link. In some embodiments, the data exchanged in the first direction of the communication link is transmitted in first time intervals, and the data exchanged in the second direction of the communication link is transmitted in second time intervals that do not overlap the first time intervals. Additionally or alternatively, the data exchanged in the first direction of the communication link is transmitted in a first radio frequency, and the data exchanged in the second direction of the communication link is transmitted in a second radio frequency that is different from the first radio frequency.

There is additionally provided, in accordance with an embodiment of the present invention, a method for communication, including:

in a wireless communication link in which a transmitter transmits data to a receiver using a set of possible Adaptive Coding and Modulation (ACM) profiles that specify respective Forward Error Correction (FEC) codes and modulation schemes and are supported by both the transmitter and the receiver, temporarily disabling a subset of the ACM profiles out of the set of the possible ACM profiles in the transmitter and the receiver; and transmitting the data from the transmitter to the receiver at a variable data rate by selecting only the ACM profiles that are not disabled.

In some embodiments, temporarily disabling the subset of the ACM profiles includes specifying a time schedule, and disabling the subset in accordance with the specified time schedule. In another embodiment, the set of the possible ACM profiles is stored in external memories of the transmitter and the receiver, some of the possible ACM profiles are cached in internal memories of the transmitter and the receiver, and temporarily disabling the subset of the ACM profiles includes disabling some of the ACM profiles that are cached in the internal memories.

In a disclosed embodiment, temporarily disabling the subset of the ACM profiles includes:

defining a reconfigured set of possible ACM profiles that are initially disabled; and switching from the set of possible ACM profiles to the reconfigured set of possible ACM profiles by disabling the ACM profiles in the set and enabling the ACM profiles in the reconfigured set.

In yet another embodiment, when the transmitter selects an ACM profile that is not disabled at the transmitter but is disabled at the receiver, the receiver is allowed to temporarily use the ACM profile selected by the transmitter.

In still another embodiment, the communication link is one of a plurality of communication links in a point-to-multipoint system that use the set of the possible ACM profiles, temporarily disabling the subset of the ACM profiles includes disabling the subset of the ACM profiles in the communication links in the plurality, and transmitting the data includes using only the ACM profiles that are not disabled in the communication links in the plurality.

In an embodiment, the wireless communication link includes one of a microwave link and a millimeter wave link. In another embodiment, the wireless communication link includes a bidirectional Time Division Duplex (TDD) link. In yet another embodiment, the wireless communication link includes a bidirectional Frequency Division Duplex (FDD) link.

There is further provided, in accordance with an embodiment of the present invention, a method for communication, including:

exchanging data between first and second communication systems over a wireless communication link at a variable data rate by selecting an Adaptive Coding and Modulation (ACM) profile, which defines a Forward Error Correction (FEC) code and a modulation scheme for encoding and modulating the data, and coordinating the selected ACM profile between the first and second communication systems by exchanging an indication message;

exchanging an enabling message, which specifies a time interval during which the first and second communication systems are expected to exchange the indication message; and regarding the exchanged indication message as valid only when received during the time interval specified in the enabling message.

In some embodiments, the enabling message marks a beginning of the time interval, and the method includes exchanging a subsequent disabling message that marks an end of the time interval.

There is also provided, in accordance with an embodiment of the present invention, a method for communication, including:

exchanging data between first and second communication systems over a wireless communication link at a variable data rate by selecting an Adaptive Coding and Modulation (ACM)

profile, which defines a Forward Error Correction (FEC) code and a modulation scheme for encoding and modulating the data, and coordinating the selected ACM profile between the first and second communication systems by exchanging an indication message;

defining a set of legitimate transitions between pairs of the possible ACM profiles, and regarding the indication message as valid only when a transition from an ACM profile that is currently in use to the ACM profile indicated in the indication message includes one of the legitimate transitions.

There is additionally provided, in accordance with an embodiment of the present invention, a communication system, including:

a transmitter, which is arranged to transmit data to a remote receiver over a wireless communication link at a variable data rate using Adaptive Coding and Modulation (ACM); and a controller, which is arranged to set the data rate at which the data is transmitted by selecting, based on feedback information that is fed back from the remote receiver, an ACM profile that defines a Forward Error Correction (FEC) code and a modulation scheme for encoding and modulating the data and, upon detecting that the feedback information is unusable, to change an operation of the transmitter independently of the feedback.

There is further provided, in accordance with an embodiment of the present invention a bidirectional wireless communication link having first and second opposite directions, the link including first and second communication systems, which are arranged to exchange data over the first and second directions by communicating at respective first and second variable data rates that are determined by respective first and second Adaptive Coding and Modulation (ACM) profiles, each ACM profile defining a Forward Error Correction (FEC) code and a modulation scheme for encoding and modulating the data, to measure respective first and second reception quality metrics of the first and second directions, and to set the first and second ACM profiles based on the first and second measured reception quality metrics, so as to cause the operation of the first and second directions to meet a joint constraint defined on an operation of the first and second directions.

There is also provided, in accordance with an embodiment of the present invention, a communication link, including:

a transmitter, which is arranged to transmit data over a wireless channel; and a receiver, which is arranged to receive the transmitted data, wherein the transmitter and the receiver are arranged to accept a definition of a set of possible Adaptive Coding and Modulation (ACM) profiles that specify respective Forward Error Correction (FEC) codes and modulation schemes that are supported by both the transmitter and the receiver for encoding and modulating the data, to temporarily disable a subset of the ACM profiles out of the set of the possible ACM profiles, and to communicate at a variable data rate by selecting only the ACM profiles that are not disabled.

There is additionally provided, in accordance with an embodiment of the present invention, a communication link, including:

a first communication system, which is arranged to send data over a wireless channel at a variable data rate by selecting an Adaptive Coding and Modulation (ACM) profile, which defines a Forward Error Correction (FEC) code and a modulation scheme for encoding and modulating the data; and a second communication system, which is arranged to receive the data, wherein the first and second communication systems are arranged to coordinate the selected ACM profile by exchanging an indication message, to exchange an enabling message, which specifies a time interval during which the first and second communication systems are expected to exchange the indication message, and to regard the exchanged indication message as valid only when received during the time interval specified in the enabling message.

There is also provided, in accordance with an embodiment of the present invention, a communication link, including:

a first communication system, which is arranged to send data over a wireless channel at a variable data rate by selecting an Adaptive Coding and Modulation (ACM) profile, which defines a Forward Error Correction (FEC) code and a modulation scheme for encoding and modulating the data; and a second communication system, which is arranged to receive the data, wherein the first and second communication systems are arranged to coordinate the selected ACM profile by exchanging an indication message, to accept a definition of a set of legitimate transitions between pairs of the possible ACM profiles, and to regard the indication message as valid only when a transition from an ACM profile that is currently in use to the ACM profile indicated in the indication message includes one of the legitimate transitions.

The present invention will be more fully understood from the following detailed description of the embodiments thereof, taken together with the drawings in which:

DETAILED DESCRIPTION OF EMBODIMENTS

Overview

Embodiments of the present invention provide improved methods and systems for controlling and managing variable-rate communication links, such as links that use Adaptive Coding and Modulation (ACM). Typically, the data rate used by the link is determined and set based on feedback, such as measurement of the reception quality, which is produced by the receiver and fed back to the transmitter.

In some scenarios, feedback from the receiver may be unusable. The term "unusable feedback" is used broadly to describe various scenarios in which the feedback cannot be used by the transmitter as a valid indication for selecting the data rate. For example, the feedback may not be fed back to the transmitter because of deteriorating channel conditions, performance degradation or equipment failure. In other scenarios, the feedback may contain errors or is otherwise distorted. In some embodiments, the transmitter carries out a predetermined open-loop policy when detecting that feedback from the receiver is unusable. Several exemplary policies are described hereinbelow.

In other embodiments that are described herein, the data rates of the two directions of a bidirectional communication link are determined jointly, given a joint constraint. The constraint may specify, for example, an explicit connection between the data rates of the two directions, or a Quality-of-Service (QoS) level to be met by both link directions. Typically, the link considers the reception quality at the two link endpoints and determines the data rate in the two directions based on the two reception quality metrics, so as to satisfy the joint constraint.

The data rate used by the communication link is typically selected from a predefined set of possible data rate values. In some situations, as described hereinbelow, it is advantageous to temporarily limit the data rate selection to a partial subset of the possible values. In some embodiments, the link temporarily disables some of the possible data rate values, so that the data rate can be selected from only a subset of the possible values. The identity of the enabled or disabled values is coordinated between the transmitter and the receiver. Methods for tolerating inconsistencies in this coordination are also described.

Other methods and systems that are described hereinbelow increase the reliability of ACM change messages that are exchanged between the transmitter and receiver.

The methods and systems described herein can be used in different types of wireless communication links, including point-to-multipoint applications.

System Description

Figure 1:
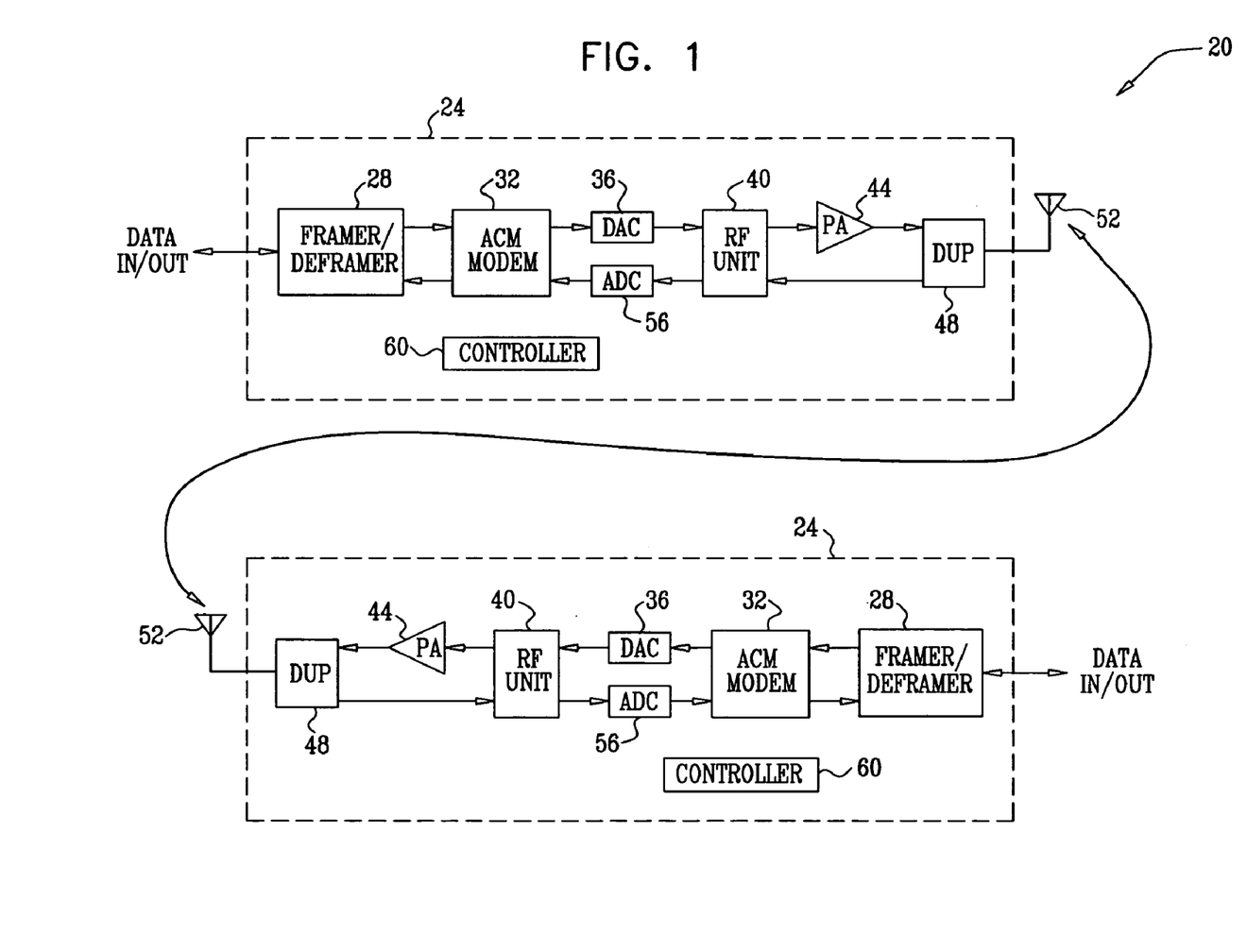
FIG. 1 is a block diagram that schematically illustrates a variable-rate communication link, in accordance with an embodiment of the present invention.

FIG. 1 is a block diagram that schematically illustrates a variable-rate communication link 20, in accordance with an embodiment of the present invention. Link 20 comprises two communication systems 24, which transmit data to one another over a wireless channel. Systems 24 are also referred to as the endpoints of the link. In some embodiments, link 20 comprises a point-to-point microwave or millimeter-wave link. Alternatively, link 20 may comprise any other suitable wireless link, such as a satellite link. Some of the methods described herein are also applicable to point-to-multipoint communication systems, as will be described below.

Link 20 is a bidirectional link, and each system 24 functions as a transmitter and as a receiver. In some embodiments, link 20 comprises a Time-Division Duplex (TDD) link. In TDD links, the two opposite link directions transmit in alternating, non-overlapping time intervals in accordance with a certain time-division protocol. In alternative embodiments, link 20 comprises a Frequency-Division Duplex (FDD) link. In these embodiments, systems 24 transmit and receive simultaneously, and each link direction is assigned a separate radio frequency. Further alternatively, link 20 can use any other suitable method for duplexing the two link directions.

In a typical flow, data enters the transmitter (one of systems 24) and is partitioned and formatted into a sequence of data frames by a framer/deframer 28. The frames typically contain management and configuration-related information in addition to user data. The data frames are processed by a variable-rate modem 32. The modem encodes the data in each data frame using a suitable Forward Error Correction (FEC) code and modulates the encoded data using a suitable modulation scheme. The modem produces a sequence of modulated symbols having a certain data rate.

Modem 32 varies the data rate of the link by using Adaptive Coding and Modulation (ACM). In ACM, the FEC code rate and the signal constellation used for modulation are jointly selected to produce the desired data rate. Each combination of code rate and signal constellation is referred to herein as an ACM profile. Typically, a set of two or more ACM profiles is predefined. A suitable ACM profile is selected and coordinated between the transmitter and the receiver.

Typically, the data in each data frame is processed using a particular ACM profile. In some embodiments, an indication as to which ACM profile is used in a particular data frame is inserted as management information into the frame by the transmitter, so as to enable the receiver to demodulate and decode the data frame using the appropriate ACM profile. Alternatively, each data frame may contain an indication of the ACM profile to be used in the next frame or in another future frame.

The sequence of modulated symbols produced by modem 32 in the transmitter is converted to an analog signal using a Digital-to-Analog Converter (DAC) 36 and provided to a Radio Frequency (RF) unit 40. The RF unit up-converts the analog signal to an appropriate RF frequency and performs filtering and amplification of the signal. The RF signal produced by unit 40 is amplified by a Power Amplifier (PA) 44. The high-power RF signal is provided via a duplexer 48 to an antenna 52, which transmits the signal over the wireless channel toward the receiver.

At the receiver (system 24 at the opposite side of the link), the RF signal is received by antenna 52 and provided via duplexer 48 to RF unit 40. The RF unit down-converts the RF signal to a suitable Intermediate Frequency (IF) or to baseband, and applies amplification and filtering. The analog signal at the output of RF unit 40 is digitized by an Analog-to-Digital Converter (ADC) 56.

The sampled signal is provided to modem 32 of the receiver, which demodulates the modulated signal in accordance with the modulation scheme used and decodes the FEC. The receiver modem uses the modulation scheme and FEC code, which are specified in the ACM profile that is currently in use, as coordinated between the transmitter and the receiver. The modem thus reconstructs the data frames that were produced by framer/deframer 28 of the transmitter. Framer/deframer 28 of the receiver extracts and outputs the user data from the reconstructed data frames.

Each System 24 comprises a controller 60, which controls and manages the operation of the system. Typically, controller 60 comprises a general-purpose processor, which is programmed in software to carry out the functions described herein. The software may be downloaded to the processor in electronic form, such as over a network or over the wireless link, or it may alternatively be supplied to the processor on tangible media, such as CD-ROM.

The selection of the appropriate ACM profile is typically based on the reception quality measured at the receiver. Based on the measured reception quality, controllers 60 of the transmitter and the receiver set modems 32 and framers/deframers 28 to apply the appropriate ACM profile.

In some embodiments, modem 32 and/or controller 60 of the receiver measure the reception quality, and report the measured quality (or the resulting ACM profile) as feedback information to the transmitter. The receiver can send the feedback information back to the transmitter by inserting the feedback information into the data frames of the opposite link direction.

The reception quality measurement and ACM profile selection functions can be divided in different ways between the transmitter and receiver. For example, the receiver may measure the reception quality, select an appropriate ACM profile, and indicate the selected profile to the transmitter. In an alternative embodiment, the receiver reports the measured reception quality, and the transmitter selects the ACM profile accordingly.

The receiver may use any suitable quality metric for measuring and quantifying the reception quality. The reception quality metric may comprise, for example, the Received Signal Level (RSL), Signal to Noise Ratio (SNR), Signal to Interference and Noise Ratio (SINR) or the Mean Square Error (MSE) of the received signal. Alternatively, the reception quality metric may comprise a Bit Error Rate (BER) or Frame Error Rate (FER) of the received signal, either before or after error correction by the FEC code.

In some embodiments, the FEC code used for encoding the data produces metrics, which can be used as quality metrics for estimating the reception quality of the link. For example, the FEC may comprise an iterative code, such as a Low Density Parity Check (LDPC) code or a Turbo code, which are well-known in the art. Decoders of iterative codes often produce metrics such as Likelihood Ratios (LR) or Log Likelihood Ratios (LLR), which can be used as reception quality metrics.

Some FEC code decoders, particularly decoders of block codes, produce metrics that indicate the decoding performance or success. For example, block code decoders often indicate whether a decoded block contains errors, i.e., whether a legitimate code word was found. The decoder may also indicate the number of errors found in a particular block. Such FEC decoder metrics can also be used as reception quality metrics. Alternatively, any other suitable metric, as well as combinations of the metrics described above, can also be used for this purpose.

In some embodiments, both directions of link 20 use ACM. The selection of ACM profile may be performed independently for each link direction, based on the reception quality measured by its respective receiver. Alternatively, the ACM profile selection can be coordinated between the two link directions, as will be described in FIG. 3 below. In the description that follows, when addressing ACM profile selection of a particular link direction, this direction will be referred to as the forward link. The opposite link direction, which is used in this context for feeding back information to the transmitter of the forward link, will be referred to as the feedback link. In some embodiments, only one link direction uses ACM while the other link direction has a fixed data rate.

ACM Operation in the Absence of Valid Feedback

As noted above, coordinating the selection and setting of ACM profiles depends on information produced at the receiver being fed-back to the transmitter. In some scenarios, however, this feedback information may be unusable by the transmitter. For example, even though the forward link is operational, the feedback link may fail or become unreliable due to hardware failure, performance degradation, channel interference or for any other reason. In other scenarios, failure or degradation in the forward channel can also result in feedback information becoming unavailable or unreliable. The absence of valid feedback information may be temporary or permanent.

Figure 2:
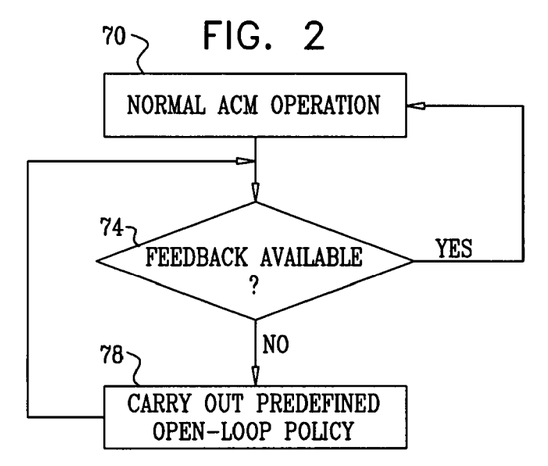
FIGS. 2-4 are flow charts that schematically illustrate methods for managing variable-rate communication links, in accordance with embodiments of the present invention.

FIG. 2 is a flow chart that schematically illustrates a method for managing variable-rate communication link 20 in the absence of usable feedback information, in accordance with an embodiment of the present invention. The method begins with link 20 operating in a normal operational mode, at a normal operation step 70. At this stage, both link directions operate properly and the transmitter and receiver adapt the data rate of the forward link using ACM, as described above.

Controller 60 of the transmitter checks whether valid feedback information is available, at a feedback checking step 74. As long as valid feedback information is available, the link continues to operate in the normal operational mode. If the transmitter controller detects that feedback information is not usable, the transmitter begins to carry out a predefined open-loop policy, at an open-loop operation step 78.

The transmitter can carry out various policies (i.e., actions or sequences of actions) in the absence of valid feedback information. Since the transmitter operates without feedback from the receiver, these actions are usually "best effort" attempts to maintain the operation of the forward link, and/or to resume operation of the feedback link.

For example, when the transmitter detects that feedback is not usable, it may switch the forward link to operate at a lower ACM profile. The new ACM profile may comprise the lowest ACM profile out of the set of possible ACM profiles. In an alternative embodiment, the transmitter can switch the forward link to the next-lower ACM profile with respect to the currently-used profile. The new ACM profile may alternatively comprise any other profile that is lower than the currently-used profile. The transmitter may also lower the ACM profile gradually over time until reaching the lowest possible profile.

(In the present context, a lower ACM profile means a profile having an improved, more robust, link budget. An improved link budget usually comes at the expense of a lower data rate, since the link budget improvement is typically achieved by using a lower code rate and/or a modulation scheme having fewer bits per symbol. Similarly, a higher ACM profile means a profile having a higher data rate, which usually comes at the expense of a less robust link budget.)

The transmitter inserts the indication of the new ACM profile into the data frames of the forward link, so that the receiver is able to switch to this profile.

The policy of lowering the ACM profile of the forward link is advantageous in situations in which the feedback is unavailable and there is also a failure or degradation in the forward link. Since no feedback is available, the transmitter has no knowledge whether the receiver is able to receive the forward link at all, or whether there is a need to switch to a lower ACM profile. In order to avoid the risk of loosing all of the data in the forward link (which may include data of varying degrees of error-tolerance or importance), it may be worthwhile to switch to a lower ACM profile, transfer less data and secure the sensitive data.

The method loops back to feedback checking step 74 above, and the transmitter continues to check whether feedback information is now available. If feedback is resumed, the transmitter returns to normal ACM operation.

Additionally or alternatively, when the transmitter detects that feedback is unusable, it may send a request to the receiver to switch the feedback link to a lower ACM profile. The requested ACM profile may comprise the lowest profile possible in the feedback link, the next-lower profile with respect to the last profile known to be used by the feedback link, or any other suitable ACM profile. This policy is advantageous when the forward link is operational, and the lack of feedback is caused by failure or degradation in the feedback link. If the request was received successfully by the receiver, the feedback link will be resumed using the lower ACM profile.

The transmitter may carry out a combined open-loop policy that attempts to modify the ACM profiles of both the forward link and the feedback link. In other words, the transmitter may lower the ACM profile of the forward link and also send a request to the receiver to lower the ACM profile of the feedback link.

Open-loop policies in the absence of valid feedback can also be carried out in point-to-multipoint applications. When link 20 comprises a point-to-multipoint link, a certain system 24, referred to as the base station, transmits data to multiple systems 24, referred to as terminals, using ACM. In some embodiments, the links between the base station and each of the terminals are managed independently in terms of ACM. In these embodiments, when feedback from a particular terminal is not available, the base station may carry out separate open-loop decisions and policies toward each terminal, irrespective of the other terminals.

In alternative embodiments, however, the ACM operation of the link and the open-loop policies may be based on the status of multiple terminals. When the base station transmits a single downlink stream to all terminals, the ACM profile selected for this transmission is typically selected based on the reception quality metrics evaluated at the multiple terminal receivers. For example, the base station may select the ACM profile that suits the terminal having the worst reception quality. In these embodiments, when feedback is not available from a particular terminal, the open-loop policy carried out by the base station inherently affects all the terminals.

ACM Coordination Between Opposite Link Directions

In some scenarios and applications, it is advantageous to coordinate the selection of the ACM profiles used by the two opposite directions of the link. For example, some links serve symmetrical applications, such as links that transport bidirectional E1 trunks. In some embodiments of the present invention, link 20 performs joint selection of the ACM profiles used by the two opposite link directions.

Figure 3:
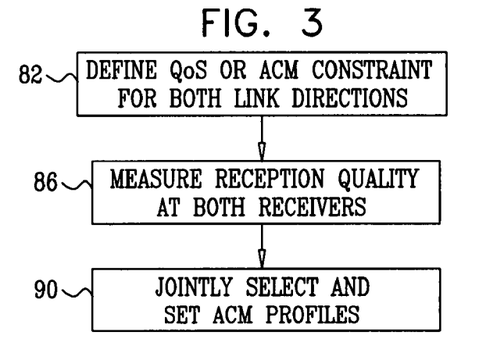

FIG. 3 is a flow chart that schematically illustrates a method for managing variable-rate communication link 20, in accordance with another embodiment of the present invention. In the present example, both link directions apply ACM. The method begins with a user defining a joint constraint for both directions of link 20, at a constraint definition step 82.

In some cases, the joint constraint specifies that the two links operate at the same ACM profile. The ACM profile may still be adapted, as long as the two link directions use the same profile at any given time. In these cases, the two link directions typically operate at an ACM profile that matches the link direction having the worse channel conditions. The other link direction, which has better channel conditions, operates at a data rate that may be lower than optimal (in terms of rate) because of the constraint.

In other cases, the joint constraint may specify that the two link directions meet a certain Quality-of-Service (QoS) level. The QoS level may be expressed in terms of a target BER, SNR, MSE or any other suitable criterion. In these cases, the two link directions may use different ACM profiles and data rates, with each direction using the highest ACM profile that still enables meeting the QoS constraint.

The two communication systems measure the reception quality at their respective receivers, at a measurement step 86. Thus, each system 24 measures the reception quality of one of the link directions. The receivers may use any suitable reception quality metric, such as the metrics described hereinabove, for this purpose.

Systems 24 jointly select and set the ACM profiles to be used by the two link directions, based on the reception quality measurements carried out by the two receivers, at a joint ACM setting step 90. For example, when the joint constraint defined at constraint definition step 82 above specifies that the two link directions use identical ACM profiles, systems 24 determine the appropriate ACM profile for each of the directions, and then set the ACM profile of both directions to the lower of the two profiles.

When the joint constraint specifies that the two links meet a certain QoS level, systems 24 set the ACM profile of each link direction to the highest possible ACM profile that meets the constraint.

Systems 24 can use different methods for coordinating the changes of ACM profiles. For example, in some embodiments, controller 60 of one of systems 24 is designated as the master controller of the link, and the controller of the other system is defined as a slave. The reception quality metrics (or the corresponding desired ACM profiles) of both link directions are provided to this controller. The master controller selects the ACM profiles so as to meet the joint constraint, and notifies the slave controller as to the newly-selected ACM profile.

In alternative embodiments, systems 24 can coordinate ACM profile changes in a symmetrical manner, without designating a master/slave relationship between them. For example, when one of systems 24 detects that its reception quality no longer meets the constraint, it lowers the ACM profile of its transmitter. When the other system 24 at the opposite side of the link detects the change, it changes the ACM profile of its transmitter accordingly. As a result, the ACM profiles of both directions change in coordination, without designating a specific master.

Alternatively, when one of systems 24 detects that its reception quality no longer meets the constraint, it may initiate a handshake procedure between controllers 60 of the two systems, so that the ACM profiles change in a synchronized manner.

In point-to-multipoint applications in which the ACM of each individual link (between the base station and a certain terminal) is managed separately, the base station can coordinate the ACM of the downlink and uplink directions of each individual link using the methods described above. In point-to-multipoint applications in which the same ACM profile is used in all downlink transmissions, a single joint constraint can be defined for the common downlink and all uplink directions. The base station performs a joint ACM profile selection, using the methods described above. The joint selection is generally based on the reception quality of the different uplink directions measured at the base station, on the different downlink reception quality measurements performed at the terminals, and on the joint constraint.

Selective Enabling of ACM Profiles

In some applications, it is advantageous to limit the choice of ACM profiles that is available for use at a particular point in time to a partial subset of the full set of possible ACM profiles.

Reducing the number of currently-available ACM profiles typically reduces the probability of erroneous profile selection. When the receiver modem errs and selects the wrong ACM profile, the error may cause loss of data or even loss of synchronization. For example, in some system configurations the size of the data frames depends on the ACM profile. In these configurations, if the receiver sets its modem and framer/deframer according to a wrongly-selected ACM profile, the size of the data frames expected by the receiver does not match the data frames transmitted by the transmitter. In some cases, the mismatch causes the link to lose its synchronization.

The number of currently-available ACM profiles can be reduced by allowing only a certain set of ACM profile transitions. For example, when the link operates using a particular ACM profile, only requests for transitions to the next-higher and to the next-lower ACM profile may be allowed. All other requested ACM profiles are interpreted as errors.

As another example, if the expected traffic load is known a-priori, the currently-available ACM profiles can be limited to match the expected traffic. For example, a certain link may be known to transmit high traffic volume only during normal office hours and to be substantially idle during the night and on weekends. It may be advantageous to enable only the lower data rate ACM profiles during low traffic periods. Alternatively, any other time-dependent policy, in which ACM profiles are enabled and disabled in accordance with a pre-defined time schedule, can also be defined.

In some embodiments, simultaneous handling of a large number of ACM profiles can be difficult for implementation reasons. For example, in some embodiments the ACM profiles are stored in an internal memory of modem 32, in order to enable fast switching. Storing the full set of possible ACM profiles may exceed the internal memory capacity of the modem. In these embodiments, the modem can cache only the partial subset of the enabled ACM profiles in its internal memory. The full set of possible ACM profiles can be stored in an external memory, such as in a memory managed by controller 60.

The ACM profiles stored in external memory are disabled and are not directly accessible to the modem. In some cases, all of the internally-cached ACM profiles are enabled. In alternative embodiments, however, some of the ACM profiles that are cached in the internal memory are disabled, i.e., only a partial subset of the internally-cached profiles is enabled.

Partial disabling of the internally-cached ACM profiles can be used, for example, for reconfiguring the ACM profiles of the link in a coordinated and hitless manner. As the link uses a certain set of enabled ACM profiles, new ACM profiles can be added (or an entirely reconfigured set can be defined). The newly-added profiles are cached in the internal memory of the modem, but are temporarily disabled. When the reconfiguration is completed at both systems 20, the reconfigured ACM profiles are enabled in a coordinated manner.

Figure 4:
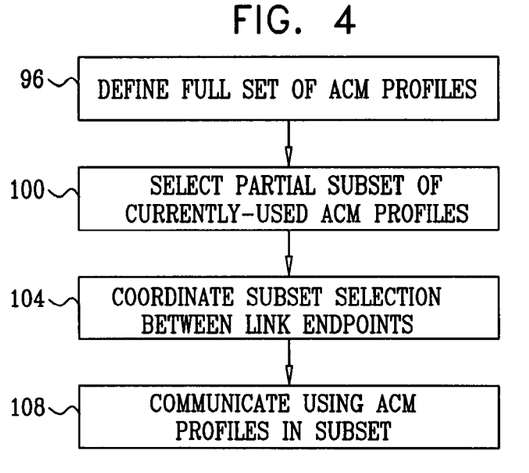

FIG. 4 is a flow chart that schematically illustrates a method for coordinating the ACM profiles in variable-rate communication link 20, in accordance with yet another embodiment of the present invention. The description refers to the ACM profiles of a particular link direction. The method begins with a user defining the full set of possible ACM profiles, at a full set definition step 96. The user selects a partial subset of the ACM profiles, which will be currently-available for use by the link, at a subset selection step 100. Systems of link 20 coordinate the selection of the subset between them, at a subset coordination step 104. Coordination is typically performed by communicating between controllers 60 of the two link endpoints. Systems 24 communicate by using the ACM profiles in the partial subset, at a communication step 108.

In some cases, a particular ACM profile may be enabled in one system 24 and disabled in the other system 24. This situation may occur, for example, because of a configuration error or when the two link endpoints are configured at different times. In these cases, a particular endpoint may be requested by the other endpoint to communicate using an ACM profile that is disabled. In order to avoid such situations, controller 60 of the endpoint may accept a request to use a disabled ACM profile only once, assuming the mismatch in configuration is temporary. Alternatively, the controller may be allowed to continue using a certain ACM profile that is being disabled, until the first time it switches to a different profile, but not to return to a disabled profile. The controller may use a state-machine or other suitable method for this purpose.

Partial enabling and disabling of ACM profiles can also be carried out in point-to-multipoint applications. The selection and enabling/disabling operations can be performed separately per each terminal or jointly for all terminals.

Increasing Reliability of ACM Profile Change Messages

As noted above, indications of the selected ACM profiles are embedded as management information in the data frames transmitted from the transmitter to the receiver. If the receiver modem errs when decoding the desired ACM profile, the error may cause loss of data or even loss of synchronization.

In order to reduce the probability of errors in decoding the ACM change messages some embodiments, the management protocol used between the transmitter and receiver may comprise means for increasing the reliability of these messages. In some embodiments, the management protocol does not allow any arbitrary ACM profile change, but only certain transitions between ACM profiles. For example, the protocol may allow only transitions between adjacent ACM profiles. Other types of transitions are considered to be invalid and caused by decoding errors.

As another example, the protocol may comprise an additional message that announces a time window, in which ACM change messages are to be allowed. Only ACM change messages that arrive within the appropriate time window following such an announcement message are considered legitimate. In alternative embodiments, the protocol comprises an enabling message, which marks the beginning of the time window, and a disabling message, which marks the end of the time window. In these embodiments, only ACM change messages that are received after the enabling message and before a disabling message are regarded as legitimate.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   transmitting data from a transmitter to a receiver over a wireless communication link at a variable data rate using Adaptive Coding and Modulation (ACM);
   setting the data rate at which the data is transmitted by selecting, based on feedback information that is fed back from the receiver to the transmitter, an ACM profile that defines a Forward Error Correction (FEC) code and a modulation scheme for encoding and modulating the data; and
   upon detecting that the feedback information is unusable, changing an operation of the transmitter independently of the feedback, wherein the feedback information is unusable when the transmitter is unable to use the feedback information as a valid indication for setting the data rate.

2. The method according to claim 1, wherein the feedback information comprises a reception quality metric evaluated by the receiver.

3. The method according to claim 2, wherein the reception quality metric comprises at least one metric selected from a group of metrics consisting of a Received Signal Level (RSL), a Signal to Noise Ratio (SNR), a Signal to Interference and Noise Ratio (SINR), a Mean Square Error (MSE), a Bit Error Rate (BER), a Frame Error Rate (FER) and a metric produced by a decoding process of the FEC.

4. The method according to claim 1, wherein changing the operation of the transmitter comprises switching to an ACM profile whose FEC code and modulation scheme define an improved link budget with respect to an ACM profile that is currently selected.

5. The method according to claim 4, wherein setting the data rate comprises selecting the ACM profile from a predefined set of possible ACM profiles, and wherein the ACM profile having the improved link budget comprises an ACM profile having a highest link budget among the possible ACM profiles.

6. The method according to claim 4, setting the data rate comprises selecting the ACM profile from a predefined set of possible ACM profiles, and wherein the ACM profile having the improved link budget comprises an ACM profile having a next-better link budget among the possible ACM profiles.

7. The method according to claim 4, wherein switching to the ACM profile having the improved link budget comprises gradually switching to ACM profiles having progressively improving link budgets.

8. The method according to claim 1, wherein setting the data rate comprises sending the feedback information from the receiver to the transmitter over a feedback communication link that uses ACM, and wherein changing the operation of the transmitter comprises transmitting a request to the receiver to send the feedback information to the transmitter using an ACM profile having an improved link budget with respect to an ACM profile that is currently selected in the feedback communication link.

9. The method according to claim 1, wherein the wireless communication link comprises one of a microwave link and a millimeter wave link.

10. The method according to claim 1, wherein the data is transmitted from the transmitter to the receiver in first time intervals, and wherein the feedback information is fed back from the receiver to the transmitter in second time intervals that do not overlap the first time intervals.

11. The method according to claim 1, wherein the data is transmitted from the transmitter to the receiver in a first radio frequency, and wherein the feedback information is fed back from the receiver to the transmitter in a second radio frequency that is different from the first radio frequency.

12. The method according to claim 1, wherein the communication link is one of a plurality of communication links in a point-to-multipoint system, and wherein detecting that the feedback information is unusable and changing the operation of the transmitter are performed independently in each of the communication links in the plurality.

13. The method according to claim 1, wherein the communication link is one of a plurality of communication links in a point-to-multipoint system, and wherein changing the operation of the transmitter is performed jointly in the communication links in the plurality upon detecting that the feedback information from one or more of the communication links is unusable.

14. A communication system, comprising:
a transmitter, which is arranged to transmit data to a remote receiver over a wireless communication link at a variable data rate using Adaptive Coding and Modulation (ACM); and
a controller, which is arranged to set the data rate at which the data is transmitted by selecting, based on feedback information that is fed back from the remote receiver, an ACM profile that defines a Forward Error Correction (FEC) code and a modulation scheme for encoding and modulating the data and, upon detecting that the feedback information is unusable, to change an operation of the transmitter independently of the feedback, wherein the feedback information is unusable when the controller is unable to use the feedback information as a valid indication to set the data rate.

15. The system according to claim 14, wherein the feedback information comprises a reception quality metric evaluated by the remote receiver.

16. The system according to claim 14, wherein the reception quality metric comprises at least one metric selected from a group of metrics consisting of a Received Signal Level (RSL), a Signal to Noise Ratio (SNR), a Signal to Interference and Noise Ratio (SINR), a Mean Square Error (MSE), a Bit Error Rate (BER), a Frame Error Rate (FER) and a metric produced by a decoding process of the FEC in the remote receiver.

17. The system according to claim 14, wherein the controller is arranged to switch the transmitter to an ACM profile having an improved link budget with respect to an ACM profile that is currently selected.

18. The system according to claim 17, wherein the controller is arranged to select the ACM profile from a predefined set of possible ACM profiles, and wherein the ACM profile having the improved link budget comprises an ACM profile having a highest link budget among the possible ACM profiles.

19. The system according to claim 17, wherein the controller is arranged to select the ACM profile from a predefined set of possible ACM profiles, and wherein the ACM profile having the improved link budget comprises an ACM profile having a next-better link budget among the possible ACM profiles.

20. The system according to claim 17, wherein the controller is arranged to gradually switch the transmitter to ACM profiles having progressively improving link budgets.

21. The system according to claim 14, and comprising a feedback receiver, which is arranged to receive the feedback information from the remote receiver over a feedback communication link that uses ACM, and wherein the controller is arranged to transmit using the transmitter a request to the remote receiver to send the feedback information using an ACM profile having an improved link budget with respect to an ACM profile that is currently selected in the feedback communication link.

22. The system according to claim 14, wherein the wireless communication link comprises one of a microwave link and a millimeter wave link.

23. The system according to claim 14, wherein the transmitter is arranged to transmit the data to the remote receiver in first time intervals, and comprising a feedback receiver, which is arranged to receive the feedback information in second time intervals that do not overlap the first time intervals.

24. The system according to claim 14, wherein the transmitter is arranged to transmit the data to the remote receiver in a first radio frequency, and comprising a feedback receiver, which is arranged to receive the feedback information in a second radio frequency that is different from the first radio frequency.

25. The system according to claim 14, wherein the communication link is one of a plurality of communication links in a point-to-multipoint system, and wherein the controller is arranged to detecting that the feedback information is unusable and to change the operation of the transmitter independently in each of the communication links in the plurality.

26. The system according to claim 14, wherein the communication link is one of a plurality of communication links in a point-to-multipoint system, and wherein the controller is arranged to change the operation of the transmitter jointly in the communication links in the plurality upon detecting that the feedback information from one or more of the communication links is unusable.

* * * * *